Patented May 21, 1929.

1,713,571

UNITED STATES PATENT OFFICE.

WILLY TRAUTNER, ROBERT BERLINER, AND BERTHOLD STEIN, OF ELBERFELD, GERMANY, ASSIGNORS TO GRASSELLI DYESTUFF CORPORATION, OF NEW YORK, N. Y., A CORPORATION OF DELAWARE.

1-PHENYL-BENZANTHRONE COMPOUNDS.

No Drawing. Application filed September 16, 1926, Serial No. 135,989, and in Germany October 8, 1925.

Our invention pertains to novel benzanthrone compounds, substituted in —1— position by a phenyl radicle, to their substitution products and to processes of producing these compounds.

We have shown in our co-pending application, Serial No. 135,984 filed on even date that anthrone compounds condense with cinnamic aldehyde and its derivatives to form cinnamylidene-anthrones, to which we assign the general formula:

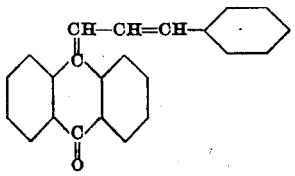

We have further found, as described in our co-pending application Serial No. 135, 988 filed on even date, that by submitting these cinnamylidene-anthrones to an aluminium chloride fusion intra-molecular condensation takes place with elimination of the phenyl group and formation of benzanthrone compounds:

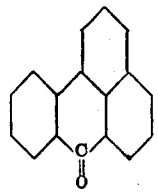

We have now found that by heating these cinnamylidene-anthrone compounds in the absence of aluminium chloride another, intra-molecular condensation with elimination of hydrogen takes place. In this particular reaction no aromatic radicle is eliminated and products are obtained which according to their analysis and behavior are phenyl-benzanthrone compounds which, as we assume, contain a phenyl group in the —1— position of the benzanthrone nucleus. The following formula corresponds to this constitution:

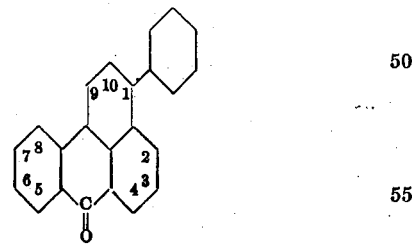

This reaction proceeds at temperatures substantially above 200° C. and particularly well between 240 and 260° C. Instead of heating the cinnamylidene-anthrones, themselves, their solutions in sufficiently high boiling organic solvents or their suspensions in an inert liquid can be heated to the above temperatures and the same results are obtained. Such high boiling solvents as for instance alpha-chloro-naphthalene, p-phenetidine, etc., molten potassium-bisulfate, mixtures of sodium and potassium acetate, which in this case do not act upon the reacting ingredients nor the final products, are very convenient suspension agents for carrying out this intra-molecular condensation.

Our novel 1-phenyl-benzanthrone compounds are well crystallized, slightly colored substances; they are soluble in organic solvents; their solutions in concentrated sulfuric acid are usually of a reddish color, showing strong fluorescence; their sulfuric acid solutions change gradually their colors, probably due to sulfonation of the phenyl-benzanthrone.

The 1-phenyl-benzanthrone itself, which can be obtained by this process with yields as high as 70% of theory, crystallizes from chlorobenzene, or glacial acetic acid in yellow needles; it dissolves in concentrated sulfuric acid with a beautiful red color showing a strong fluorescence. The melting point of the purified products was found to be 181° C.

Substituted cinnamylidene-anthrones such as alpha- or beta-chlor, methyl- or hydroxy derivatives as obtained in accordance with our co-pending application Serial No. 135,984 of even date react likewise by heating to 250–260° C. in presence or absence of a solvent or suspension agent to form the corresponding 1-phenyl-benzanthrone compounds.

The following examples will further illustrate our invention, the parts being by weight, but we wish it to be understood that our invention is not limited to the particular materials and reacting conditions indicated therein.

*Example 1.*—Cinnamylidene-anthrone of the formula:

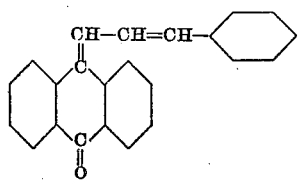

is heated until a temperature of 260° C. is reached. At this point a violent reaction sets in which is nearly instantaneously finished; the melt is allowed to cool to a crystalline mass, which is taken up in chlorobenzene, from which yellow needles are obtained by recrystallization. They dissolve in concentrated sulfuric acid with a beautiful red coloration, showing a strong fluorescence. They melt at 181° C. They represent the 1-phenyl-benzanthrone of the formula:

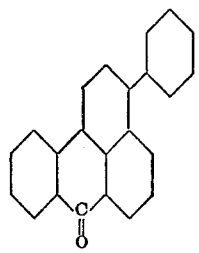

The yield is about 60–70% of theory.

*Example 2.*—10 parts cinnamylidene-anthrone are dissolved in 5 parts alpha-chloro-naphthalene and heated to about 240–250° C. until a sample, dissolve in concentrated sulfuric acid, does not show any more the presence of the cinnamylidene-anthrone. After some cooling of the melt one half its volume glacial acetic acid is added, and on further cooling yellow needles separate which are identical with the 1-phenyl-benzanthrone obtained in Example 1. The yield is about 60% of theory.

*Example 3.*—10 parts cinnamylidene-anthrone are heated for a short time with 5 parts p-phenetidine to boiling until a sample, dissolved in concentrated sulfuric acid, does not show any more the presence of the cinnamylidene-anthrone. The melt is allowed to cool to room temperature and beautiful yellow needles of 1-phenylbenzanthrone separate. The yield is about 60–70% of theory.

*Example 4.*—10 parts cinnamylidene-anthrone are introduced into a molten mixture of 25 parts potassium acetate and 25 parts sodium acetate and heated to 250–260° C. until the condensation is complete. The melt is poured into water, boiled up and filtered. The insoluble dried product is then crystallized from glacial acetic acid or chlorobenzene. It is the 1-phenyl-benzanthrone, identical with the product described in Example 1.

Potassium bisulfate or mixtures of sodium and potassium bisulfate can be used as inert suspension agents instead of the above described mixture of sodium and potassium acetate.

*Example 5.*—10 parts alpha-hydroxy-cinnamylidene anthrone are added at 100° C. to 5 parts alpha-chloro-naphthalene and the melt heated to 220–240° C. The melt is allowed to cool after the reaction is complete and some methanol is added, whereby the melt solidifies. The reaction product is obtained as yellow colored crystals by crystallization from pyridine. It dissolves in concentrated sulfuric acid with an orange-red coloration showing strong fluorescence. This color changes on standing to orange with strong yellow fluorescence. The product represents a 1-phenyl-alpha-hydroxy-benzanthrone containing the hydroxyl in the 4, 5 or 8 position. The yield is about 45–50% of theory.

*Example 6.*—50 parts beta-chloro-cinnamylidene-anthrone are added at 100° C. to 25 parts alpha-chloro-naphthalene and heated to 250–260° C. until the condensation is complete. The melt is several times digested with methanol, whereby it forms, after some time, a crystalline magma. This is mixed with acetone, filtered and the insoluble washed with acetone. The so obtained product dissolves in concentrated sulfuric acid with a red color showing a less bluish tint than the sulfuric acid solution of the simple 1-phenyl-benzanthrone of Example 1. It represents a 1-phenyl-beta-chloro-benzanthrone containing the chlorine in the 2, 3, 6 or 7 position. The yield is about 20% of theory.

We claim:

1. The process of producing 1-phenyl-benzanthrone compounds which consists in heating cinnamylidene-anthrone compounds to temperatures above 200° C.

2. The process of producing 1-phenyl-benzanthrone compounds which consists in heating cinnamylidene-anthrone compounds to temperatures of about 250° C.

3. The process of producing 1-phenyl-benzanthrone compounds which consists in heating cinnamylidene-anthrone compounds in presence of a high boiling inert liquid to temperatures around 250° C.

4. The process of producing 1-phenyl-benzanthrone which consists in heating cinnamylidene-anthrone to temperatures above 200° C.

5. The process of producing 1-phenyl-benzanthrone which consists in heating cinnamylidene-anthrone to temperatures of about 250° C.

6. The process of producing 1-phenyl-benzanthrone which consists in heating cinnamylidene-anthrone in presence of a high boiling, inert liquid to temperatures of about 250° C.

7. As new products 1-phenyl-benzanthrone compounds of the probable general formula:

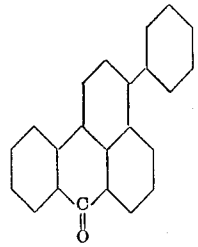

which are slightly colored crystalline substances, soluble in organic solvents and soluble in concentrated sulfuric acid with reddish colors.

8. As a new product 1-phenyl-benzanthrone of the probable formula:

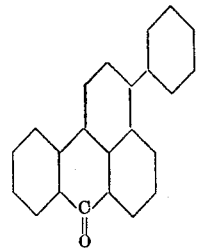

which by crystallization from chlorobenzene or glacial acetic acid can be obtained as yellow needles melting at 181° C. and which is soluble in concentrated sulfuric acid with a beautiful red color, showing a strong fluorescence.

In testimony whereof we have hereunto set our hands.

WILLY TRAUTNER.
ROBERT BERLINER.
BERTHOLD STEIN.